United States Patent
Nakashima et al.

(10) Patent No.: US 12,307,829 B2
(45) Date of Patent: May 20, 2025

(54) CONTROL APPARATUS, SYSTEM, AND CONTROL METHOD

(71) Applicant: TOYOTA JIDOSHA KABUSHIKI KAISHA, Toyota (JP)

(72) Inventors: Toyokazu Nakashima, Nagoya (JP); Takeshi Takemoto, Nagoya (JP); Naoko Yamafuji, Nagoya (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 17/822,336

(22) Filed: Aug. 25, 2022

(65) Prior Publication Data

US 2023/0061997 A1 Mar. 2, 2023

(30) Foreign Application Priority Data

Aug. 26, 2021 (JP) ................. 2021-138393

(51) Int. Cl.
*G07C 5/00* (2006.01)
*B60W 50/14* (2020.01)
*G07C 5/08* (2006.01)

(52) U.S. Cl.
CPC ............ *G07C 5/008* (2013.01); *B60W 50/14* (2013.01); *G07C 5/0841* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 7,366,892 | B2* | 4/2008 | Spaur ............... | H04L 63/0861 713/161 |
| 11,010,827 | B1* | 5/2021 | Latronico ............ | G06Q 40/03 |
| 2002/0016655 | A1* | 2/2002 | Joao ........ | G07C 5/085 701/33.4 |
| 2002/0032626 | A1* | 3/2002 | DeWolf ............... | G06Q 30/06 705/36 R |
| 2002/0093419 | A1* | 7/2002 | Nakayama ........... | B60R 25/102 340/988 |
| 2015/0256877 | A1* | 9/2015 | Yoneda ............... | H04N 21/458 725/34 |
| 2021/0044737 | A1* | 2/2021 | Kang ................... | G07C 5/008 |
| 2022/0308647 | A1* | 9/2022 | Nishizaka ............ | G06Q 10/02 |

FOREIGN PATENT DOCUMENTS

JP 2010-009572 A 1/2010

* cited by examiner

*Primary Examiner* — Daniel L Greene
*Assistant Examiner* — Robert L Pinkerton
(74) *Attorney, Agent, or Firm* — Oliff PLC

(57) ABSTRACT

A control apparatus includes a controller configured to, when it is detected that first vehicle data obtained by monitoring a state of a vehicle and disclosed with consent of an owner of the vehicle has been viewed by a user, notify the user of first information prompting for consent to disclose second vehicle data obtained by monitoring a state of the vehicle after a point in time at which the first vehicle data was viewed, or second information inquiring whether the owner of the vehicle is to change.

5 Claims, 7 Drawing Sheets

CONTROL APPARATUS, SYSTEM, AND CONTROL METHOD

CROSS-REFERENCE TO RELATED APPLICATION

This application claims priority to Japanese Patent Application No. 2021-138393 filed on Aug. 26, 2021, the entire contents of which are incorporated herein by reference.

TECHNICAL FIELD

The present disclosure relates to a control apparatus, a system, and a control method.

BACKGROUND

Patent literature (PTL) 1 discloses information processing technology for recording automobile management history data.

CITATION LIST

Patent Literature

PTL 1: JP 2010-9572 A

SUMMARY

In view of protecting personal information, consent from the owner of a vehicle may be required to disclose, to a third party, vehicle data obtained by monitoring a state of the vehicle. In particular, in a case in which the owner of a vehicle has changed due to reasons such as the sale of the vehicle, it is necessary to newly obtain consent from the new owner to disclose, to a third party, vehicle data that is obtained after the change of owner. With the technology described in PTL 1, the administrator of the vehicle data cannot detect the change of owner and therefore cannot ask the new owner for consent to provision of the vehicle data. The vehicle data cannot be provided to a third party unless consent from the new owner is obtained, and thus the vehicle data cannot be used effectively.

It would be helpful to facilitate the effective use of vehicle data.

A control apparatus according to the present disclose includes a controller configured to, when it is detected that first vehicle data obtained by monitoring a state of a vehicle and disclosed with consent of an owner of the vehicle has been viewed by a user, notify the user of first information prompting for consent to disclose second vehicle data obtained by monitoring a state of the vehicle after a point in time at which the first vehicle data was viewed, or second information inquiring whether the owner of the vehicle is to change.

A control method according to the present disclose includes:
transmitting, by a terminal apparatus, to a control apparatus, when first vehicle data obtained by monitoring a state of a vehicle and disclosed with consent of an owner of the vehicle is viewed by a user via the terminal apparatus, viewing information that indicates that the first vehicle data has been viewed; and
transmitting, by the control apparatus, to the terminal apparatus, when the control apparatus received the viewing information, first information prompting for consent to disclose second vehicle data obtained by monitoring a state of the vehicle after a point in time at which the first vehicle data was viewed, or second information inquiring whether the owner of the vehicle is to change.

According to the present disclosure, the effective use of vehicle data is facilitated.

DETAILED DESCRIPTION

Figure 1:
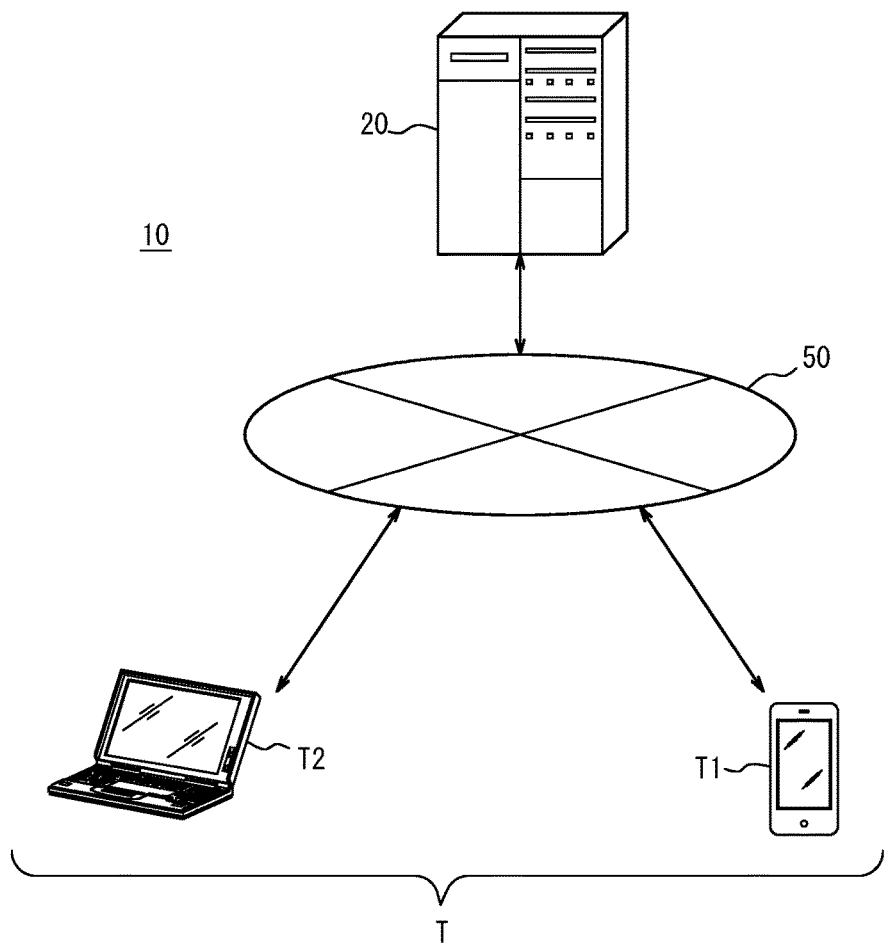
FIG. 1 is a block diagram illustrating a configuration of a system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes a control apparatus 20 and two or more terminal apparatuses T. The control apparatus 20 can communicate with each terminal apparatus T via a network 50.

The control apparatus 20 is installed in a facility such as a data center. The control apparatus 20 is a computer such as a server that belongs to a cloud computing system or another type of computing system. The control apparatus 20 records vehicle data VD obtained by monitoring a state of a vehicle. The control apparatus 20 can transmit the vehicle data VD or other information to the terminal apparatus T via the network 50. The control apparatus 20 is, for example, managed by the administrator of the system 10 or by a company operating any system that provides the vehicle data VD.

The terminal apparatus T is, for example, a mobile device such as a mobile phone, a smartphone, or a tablet. The terminal apparatus T is used by a user U of the system 10. The terminal apparatus T may be a computer installed at a vehicle dealer that uses the vehicle data VD. The user U of the system 10 includes the owner of the vehicle. The user U of the system 10 can access, via the terminal apparatus T, the vehicle data VD recorded on the control apparatus 20 and view the vehicle data VD. In other words, the vehicle data VD can be viewed via the terminal apparatus T.

The vehicle data VD is generally considered to be viewed primarily in the following cases. In a case in which the owner P of a certain vehicle V wants to sell the vehicle V, for example, the owner P views, as the vehicle data VD, data obtained by monitoring the state of the vehicle V. The reason is that such data can be used as evaluation data to determine the sale price of the vehicle V. Alternatively, a potential buyer who intends to purchase a certain vehicle W views, as the vehicle data VD, data obtained by monitoring a state of the vehicle W. The potential buyer can learn the state, performance, maintenance history, or the like of the vehicle W from such data and can therefore purchase the vehicle W with confidence.

The network 50 includes the Internet, at least one WAN, at least one MAN, or any combination thereof. The term "WAN" is an abbreviation of wide area network. The term "MAN" is an abbreviation of metropolitan area network. The network 50 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

In the present embodiment, data obtained by monitoring a state of a vehicle is acquired as vehicle data VD. The acquired vehicle data VD is stored on a cloud server, for example, and in cases such as when the vehicle is to be bought and sold, i.e., traded, the vehicle data VD is provided to a third party as a potential buyer, with the consent of the owner of the vehicle to be traded.

In the present embodiment, the vehicle data VD may be acquired by any appropriate procedure, such as the following procedure. The vehicle data VD is acquired by an in-vehicle communication device, which communicates via a CAN with various ECUs mounted in the vehicle, and is uploaded from the in-vehicle communication device and stored on a cloud server. The term "ECU" is an abbreviation of Electronic Control Unit. The term "CAN" is an abbreviation of Controller Area Network. The control apparatus 20 communicates with the cloud server to acquire the vehicle data VD stored on the cloud server. Alternatively, the control apparatus 20 may be that cloud server. In other words, the vehicle data VD may be stored on the control apparatus 20.

In the present embodiment, the vehicle data VD includes information, transmitted from the vehicle, regarding vehicle travel and regarding the state of the vehicle. The vehicle data VD may further include information obtained by processing the information regarding vehicle travel and the information regarding the state of the vehicle.

Information regarding vehicle travel is data obtained by recording values that vary along the travel of the vehicle. The information regarding vehicle travel includes data that indicates a collision history, usage history, or distance traveled by the vehicle. The collision history is a record of collisions of the vehicle with any object, such as an obstacle. A collision of the vehicle may be detected by any procedure, such as by a collision detection sensor mounted in the vehicle. A collision of the vehicle may be detected based on a signal from a vibration sensor mounted in the vehicle. Alternatively, a collision of the vehicle may be detected by analysis of images captured by an in-vehicle imaging apparatus, such as a drive recorder, mounted in the vehicle. Sensor data obtained by various sensors mounted in the vehicle are acquired by the ECU. The ECU transfers, via the CAN, the acquired sensor data to an in-vehicle communication device. The sensor data is uploaded from the in-vehicle communication device and stored on the cloud server as vehicle data VD. The usage history is a record of the usage conditions of the vehicle. For example, fuel consumption values calculated based on the travel history of the vehicle, the average number of driving days per unit period, or the average travel distance per unit travel are recorded as the usage history. The travel distance is acquired from, for example, an odometer mounted in the vehicle. Alternatively, the travel distance may be calculated based on, for example, the travel history of the vehicle. It may be determined that an odometer mounted in the vehicle has been rewound in a case in which the difference between the travel distance calculated based on the travel history of the vehicle and the travel distance acquired from the odometer is equal to or greater than a threshold.

Information regarding the state of the vehicle includes data regarding the conditions of components or systems mounted in the vehicle. The data regarding components mounted in the vehicle includes data that indicates the operating state of the engine, motor system, transmission, brakes, battery, or the like of the vehicle. The data regarding the condition of the system mounted in the vehicle includes data that indicates the maintenance history of the vehicle or data for fault diagnosis of the vehicle. The maintenance history of the vehicle includes, for example, the types of various inspections performed on the vehicle, the time when the inspections were performed, or records of the replacement of consumable parts such as tires, engine oil, oil filters, or brake pads. The data for failure diagnosis of the vehicle is, for example, data acquired through "diagnostic communication", which uses data transmitted and received by inter-ECU communication conducted via the in-vehicle network such as the CAN to diagnose failures.

The information obtained by processing the information regarding vehicle travel and the state of the vehicle includes, for example, information yielded by integrating the information regarding vehicle travel and the state of the vehicle with basic information that indicates the type, model, and the like of the vehicle, and processing the result as a vehicle chart. The vehicle chart includes various information related to the value and evaluation of the vehicle, such as records of vehicle use or records of vehicle repairs or inspections.

In the present embodiment, the vehicle data VD is, for example, managed by an administrator of the system 10. The administrator of the system 10 is, for example, a vehicle manufacturer that produces the vehicle for which the vehicle data VD is to be acquired. Alternatively, the vehicle data VD may be managed by a company operating any system that provides the vehicle data VD.

In the present embodiment, "disclosing the vehicle data VD to a third party" includes allowing a third party to view the vehicle data VD obtained by monitoring the state of the vehicle. The "third party" may include the user U of the system 10.

In view of protecting personal information, the consent of the owner of the vehicle from which the vehicle data VD was obtained is required to disclose the vehicle data VD. In particular, in a case in which the owner of a vehicle has changed for reasons such as the sale of the vehicle, the consent of the new owner is required for provision of vehicle data obtained after the change of owner, despite the vehicle data being obtained for the same vehicle. For example, it is assumed that a first user U1 owned a vehicle V but sold the vehicle V to a second user U2. It is further assumed that consent had been obtained from the first user U1, who was the owner P of the vehicle V, to provide vehicle data obtained before the sale. Even in such a case, consent from the second user U2, who is the new owner of the vehicle V, is required for provision of the vehicle data obtained after the sale of the vehicle V. As described above, the vehicle data VD is acquired by an in-vehicle communication device, which communicates via a CAN with various ECUs mounted in the vehicle VH, and is uploaded from the in-vehicle communication device and stored on a cloud server. Therefore, for example, in a case in which a vehicle transaction is conducted at an authorized dealer of the vehicle manufacturer, who is the administrator of the system 10, the vehicle manufacturer can, at the time of sale of a vehicle in which an in-vehicle communication device is mounted, obtain consent via the authorized dealer from the buyer, i.e., the new owner of the vehicle, to disclose the vehicle data VD to be obtained by the in-vehicle communication device. The reason is that vehicle transactions made by authorized dealers are notified to the vehicle manufacturer. On the other hand, in a case in which a vehicle transaction is conducted without going through an authorized dealer, for example through an unauthorized dealer such as a used car dealer or auction site, or is conducted between individuals, the vehicle manufacturer is not notified of the transaction. Consequently, the vehicle manufacturer cannot detect a change in ownership due to a vehicle transaction and therefore cannot obtain consent from the buyer, i.e., the new owner, to disclose the vehicle data VD. In this case, the vehicle manufacturer cannot allow a third party to view the vehicle data VD and cannot make effective use of the vehicle data VD. There is also a risk that vehicle data VD that should not be disclosed due to lack of consent from the owner will be disclosed by mistake.

In the system 10 according to the present embodiment, when first vehicle data VD1 is viewed by a user U via a terminal apparatus T, viewing information that indicates that the first vehicle data VD1 has been viewed is transmitted by the terminal apparatus T to the control apparatus 20. The first vehicle data VD1 is data obtained by monitoring a state of the vehicle V and is disclosed with the consent of the owner P of the vehicle V. The control apparatus 20 receives the viewing information from the terminal apparatus T. The control apparatus 20 transmits either first information RD1 or second information RD2 to the terminal apparatus T. The first information RD1 is information prompting for consent to disclose second vehicle data VD2. The second vehicle data VD2 is data obtained by monitoring a state of the vehicle V after a point in time at which the first vehicle data VD1 was viewed. The second information RD2 is information that inquires whether the owner of the vehicle V is to change.

According to the present embodiment, consent can be sought from the new owner even in a case in which the owner of the vehicle has changed due to reasons such as the sale of the vehicle. Accordingly, a situation is likely to be avoided in which the vehicle data VD cannot be disclosed to a third party due to the lack of consent from the new owner. Therefore, the effective use of the vehicle data VD is facilitated.

Figure 2:
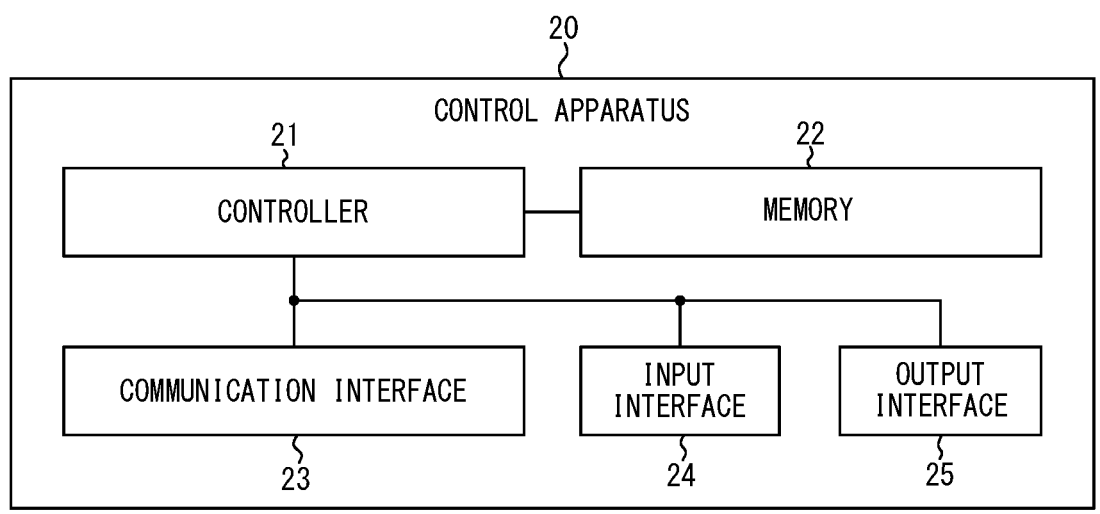
FIG. 2 is a block diagram illustrating a configuration of a control apparatus according to an embodiment of the present disclosure.

A configuration of the control apparatus 20 according to the present embodiment will be described with reference to FIG. 2.

The control apparatus 20 includes a controller 21, a memory 22, a communication interface 23, an input interface 24, and an output interface 25.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the control apparatus 20 while controlling components of the control apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20. In the present embodiment, the vehicle data VD may be stored in the memory 22.

The communication interface 23 includes at least one interface for communication. The interface for communication is, for example, a LAN interface. The communication interface 23 receives data to be used for the operations of the control apparatus 20, and transmits data obtained by the operations of the control apparatus 20. In the present embodiment, the communication interface 23 communicates with the first terminal apparatus 30 and the second terminal apparatus 40.

The input interface 24 includes at least one interface for input. The interface for input is, for example, a physical key, a capacitive key, a pointing device, a touch screen integrally provided with a display, or a microphone. The input interface 24 accepts an operation for inputting data to be used for the operations of the control apparatus 20. The input interface 24, instead of being included in the control apparatus 20, may be connected to the control apparatus 20 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data obtained by the operations of the control apparatus 20. The output interface 25, instead of being included in the control apparatus 20, may be connected to the control apparatus 20 as an external output device. As the connection method, any technology such as USB, HDMI®, or Bluetooth® can be used.

The functions of the control apparatus 20 are realized by execution of a control program according to the present embodiment by a processor serving as the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a programmable circuit or a dedicated circuit serving as the controller 21. That is, some or all of the functions of the control apparatus 20 may be realized by hardware.

Figure 3:
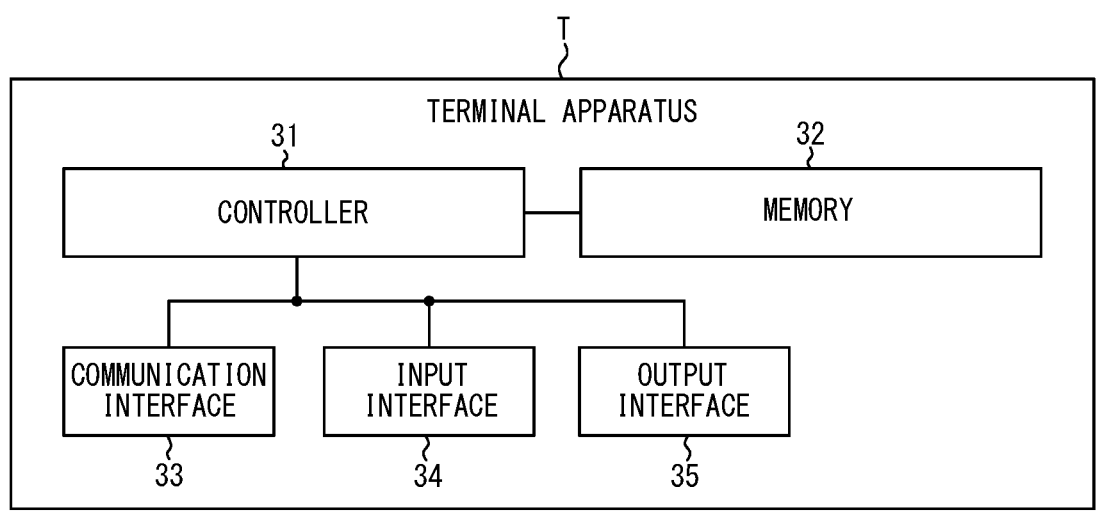
FIG. 3 is a block diagram illustrating a configuration of a terminal apparatus according to an embodiment of the present disclosure.

A configuration of the terminal apparatus T according to the present embodiment will be described with reference to FIG. 3.

The terminal apparatus T includes a controller 31, a memory 32, a communication interface 33, an input interface 34, and an output interface 35.

The controller 31 includes at least one processor, at least one programmable circuit, at least one dedicated circuit, or a combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 31 executes processes related to operations of the terminal apparatus T while controlling components of the terminal apparatus T.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores data to be used for the operations of the terminal apparatus T and data obtained by the operations of the terminal apparatus T.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives data to be used for the operations of the terminal apparatus T and transmits data obtained by the operations of the terminal apparatus T.

The input interface 34 includes at least one interface for input. The interface for input is, for example, a physical key, a capacitive key, a pointing device, a touch screen integrally provided with a display, or a microphone. The input interface 34 accepts an operation for inputting data to be used for the operations of the terminal apparatus T. The input interface 34 may be connected to the terminal apparatus T as an external input device, instead of being included in the terminal apparatus T. As the connection method, any technology such as USB, HDMI®, or Bluetooth® can be used.

The output interface 35 includes at least one interface for output. The interface for output is, for example, a display or a speaker. The display is, for example, an LCD or an organic EL display. The output interface 35 outputs data obtained by the operations of the terminal apparatus T. The output interface 35 may be connected to the terminal apparatus T as an external output device, instead of being included in the terminal apparatus T. As the connection method, any technology such as USB, HDMI®, or Bluetooth® can be used.

The functions of the terminal apparatus T are realized by execution of a terminal program according to the present embodiment by a processor serving as the controller 31. That is, the functions of the terminal apparatus T are realized by software. The terminal program causes a computer to execute the operations of the terminal apparatus T, thereby causing the computer to function as the terminal apparatus T. That is, the computer executes the operations of the terminal apparatus T in accordance with the terminal program to thereby function as the terminal apparatus T.

Some or all of the functions of the terminal apparatus T may be realized by a programmable circuit or a dedicated circuit serving as the controller 31. That is, some or all of the functions of the terminal apparatus T may be realized by hardware.

Figure 4:
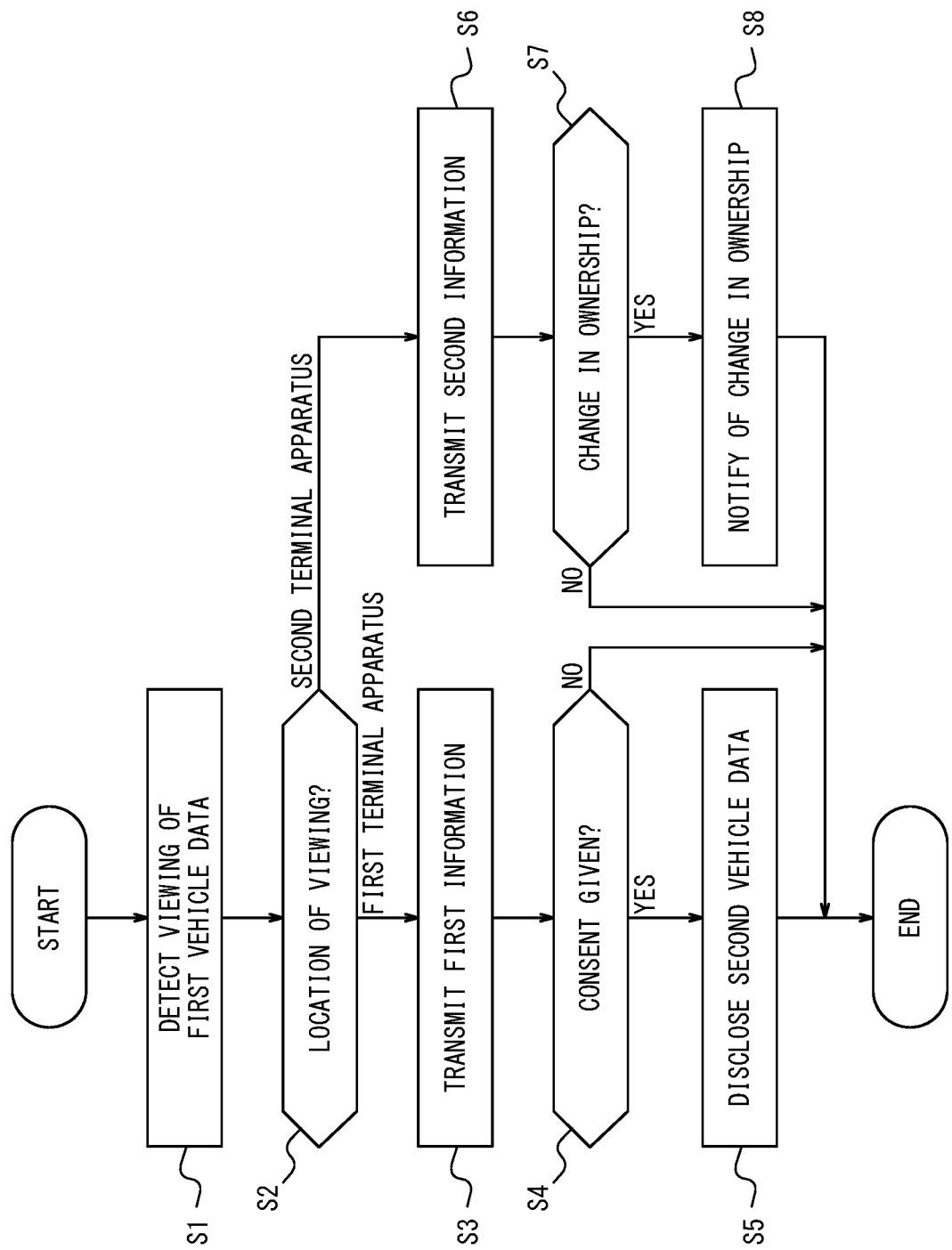
FIG. 4 is a flowchart illustrating operations of the control apparatus according to an embodiment of the present disclosure.

Operations of the system 10 according to the present embodiment will be described with reference to FIG. 4. These operations correspond to a control method according to the present embodiment. FIG. 4 illustrates operations of the control apparatus 20 in the system 10 according to the present embodiment.

As illustrated in FIG. 1, in the present embodiment, two or more terminal apparatuses T include a first terminal apparatus T1 and a second terminal apparatus T2. The number of terminal apparatuses is not limited to two and may be freely set to one or to three or more.

In step S1, the controller 21 of the control apparatus 20 detects that the first vehicle data VD1, which is obtained by monitoring a state of the vehicle and disclosed with consent of the owner P of the vehicle V, has been viewed by a user U. Specifically, when the first vehicle data VD1 is viewed by the user U via any terminal apparatus T, the controller 31 of the terminal apparatus T generates viewing information that indicates that the first vehicle data VD1 has been viewed. At this time, the controller 31 of the terminal apparatus T includes identification information for the terminal apparatus T in the viewing information. The identification information for the terminal apparatus T is, for example, the terminal ID. The term "ID" is an abbreviation of identifier. The controller 31 transmits, via the communication interface 33, the generated viewing information to the control apparatus 20. The control apparatus 20 detects that the first vehicle data VD1 has been viewed by receiving, via the communication interface 23, the viewing information transmitted from the terminal apparatus T.

In the present embodiment, the owner P of the vehicle V is associated with at least one vehicle dealer among a plurality of vehicle dealers S. In one example, the vehicle dealers S are each authorized dealers of the vehicle manufacturer that manages the system 10. The vehicle dealer with which the owner P of the vehicle V is associated may be determined freely. For example, the owner P may be associated with a vehicle dealer that is regularly visited by the owner P. Alternatively, the owner P may be associated with a vehicle dealer from whom the owner P purchased the vehicle V. The controller 21 of the control apparatus 20 acquires dealer information that indicates the vehicle dealer associated with the owner P of the vehicle V. The dealer information may be acquired by any appropriate procedure, such as the following procedure. In the memory 22 of the control apparatus 20, for example, a database DB1 is constructed in which information on pairs of vehicle dealers and vehicle owners is registered in advance. The controller 21 of the control apparatus 20 searches the database DB1 using the identification information of the owner P as a search key. The identifying information of the owner P is, for example, the owner ID. Based on the search results, the controller 21 selects a vehicle dealer with which the owner P is associated. The database DB1 may be constructed on the cloud. Alternatively, the database DB1 may be constructed on an external storage and connected to the control apparatus 20. As one example, it is assumed that the owner P is associated with a vehicle dealer S1. Therefore, the controller 21 selects the vehicle dealer S1 as the vehicle dealer associated with the owner P. In other words, the controller 21 acquires information that indicates the vehicle dealer S1 as the dealer information.

In step S2, the controller 21 of the control apparatus 20 determines the location from which the user U viewed the first vehicle data VD1. Specifically, the controller 21 determines whether the terminal apparatus T is the first terminal apparatus T1 or the second terminal apparatus T2. The first terminal apparatus T1 is a terminal apparatus T of a different vehicle dealer than the vehicle dealer S1 associated with the owner P of the vehicle V. The second terminal apparatus T2 is a terminal apparatus T of the vehicle dealer S1 associated with the owner P of the vehicle V.

The terminal apparatus T may be determined by any appropriate method, but in the present embodiment, the controller 21 identifies the terminal apparatus T based on the terminal ID included in the viewing information received in step S1. In a case in which the terminal apparatus T is determined to be the first terminal apparatus T1, i.e., in a case in which it is detected that the first vehicle data VD1 has been viewed by the user U via the first terminal apparatus T1, the process of step S3 is performed.

In step S3, the controller 21 of the control apparatus 20 transmits the first information RD1 to the terminal apparatus T. The first information RD1 is information prompting for consent to disclose the second vehicle data VD2, which is obtained by monitoring a state of the vehicle V after a point in time at which the first vehicle data VD1 was viewed. Specifically, the controller 21 transmits the first information RD1 via the communication interface 23 to the first terminal apparatus T1 determined as the terminal apparatus T in step S2.

Figure 5:
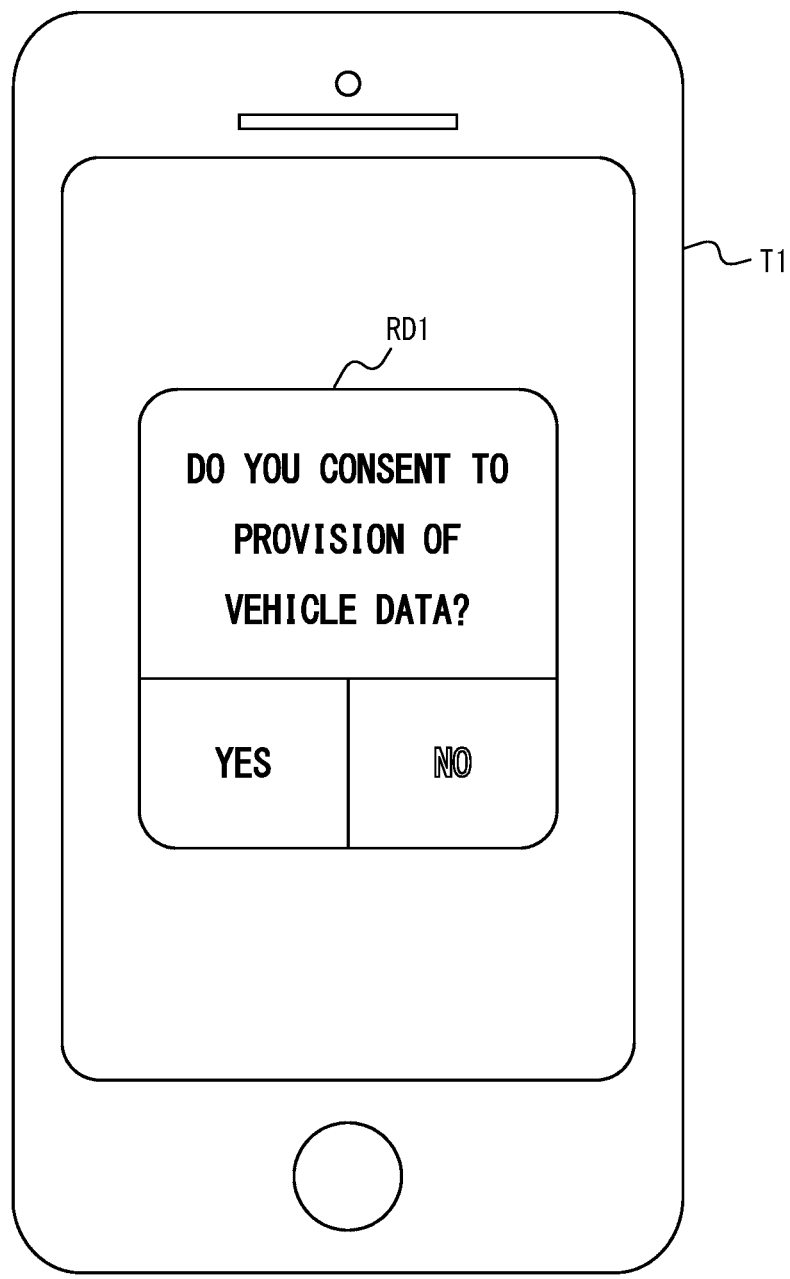
FIG. 5 is a schematic diagram illustrating an example screen on a first terminal apparatus according to an embodiment of the present disclosure.

In the present embodiment, as the first information RD1, a message "DO YOU CONSENT TO PROVIDING VEHICLE DATA?" is transmitted in the form of an inquiry. In the example of FIG. 5, the controller 31 of the first terminal apparatus T1 receives the message from the control apparatus 20, via the communication interface 33 and controls the output interface 35, which is a display or the like, to output the received message. In the present embodiment, the controller 31 of the first terminal apparatus T1 controls a display corresponding to the output interface 35 to display the content of the first information RD1; the controller 31 may control a speaker corresponding to the output interface 35 to output the content of the first information RD1 as audio. The reason for transmitting, as the first information RD1, a message "DO YOU CONSENT TO PROVIDING VEHICLE DATA?" in a case in which the first vehicle data VD1 is viewed on the first terminal apparatus T1 is as follows. In a case in which viewing is detected from elsewhere than the vehicle dealer that is regularly visited by the owner P of the vehicle V, it can be considered that the owner P is highly likely have disposed of the vehicle V, making the consent of the new owner of the vehicle V necessary.

In step S4, in a case in which the user U has performed an operation to input a response to the inquiry, the controller 31 of the first terminal apparatus T1 controls the input interface 34 to accept the operation. In the example of FIG. 5, the user U performs an operation of touching "YES" or "NO", displayed on the touch screen serving as the input interface 34 of the first terminal apparatus T1. The controller 31 of the first terminal apparatus T1 accepts the operation of touching "YES" as an operation by which the user U gives consent in response to the inquiry. Instead of touching the touch screen, the user U may provide audio input through a microphone serving as the input interface 34 of the first terminal apparatus T1. The controller 31 of the first terminal apparatus T1 generates answer data AD1 that indicates that the user U has given consent. The controller 31 of the first terminal apparatus T1 transmits the generated answer data AD1 to the control apparatus 20 via the communication interface 33. Then, the process of step S5 is performed. On the other hand, the controller 31 of the first terminal apparatus T1 accepts the operation of touching "NO" as an operation by which the user U does not give consent in response to the inquiry. In this case, the flow of FIG. 4 ends.

In step S5, the controller 21 of the control apparatus 20 performs control to disclose the second vehicle data VD2 to a third party. Specifically, upon receiving, in step S4, the answer data AD1 transmitted from the first terminal apparatus T1 via the communication interface 23, the controller 21 of the control apparatus 20 performs control to disclose the second vehicle data VD2 to a third party. The second vehicle data VD2 may be disclosed to a third party by any appropriate method. For example, the controller 21 of the control apparatus 20 discloses the second vehicle data VD2 to a third party by controlling a web server to publish the second vehicle data VD2 on the Internet.

In step S2, in a case in which the terminal apparatus T is determined to be the second terminal apparatus T2, i.e., in a case in which it is detected that the first vehicle data VD1 has been viewed by the user U via the second terminal apparatus T2, the process of step S6 is performed.

In step S6, the controller 21 of the control apparatus 20 transmits the second information RD2 to the terminal apparatus T. The second information RD2 is information that inquires whether the owner of the vehicle V is to change. Specifically, the controller 21 transmits the second information RD2 via the communication interface 23 to the second terminal apparatus T2 determined as the terminal apparatus T in step S2.

Figure 6:
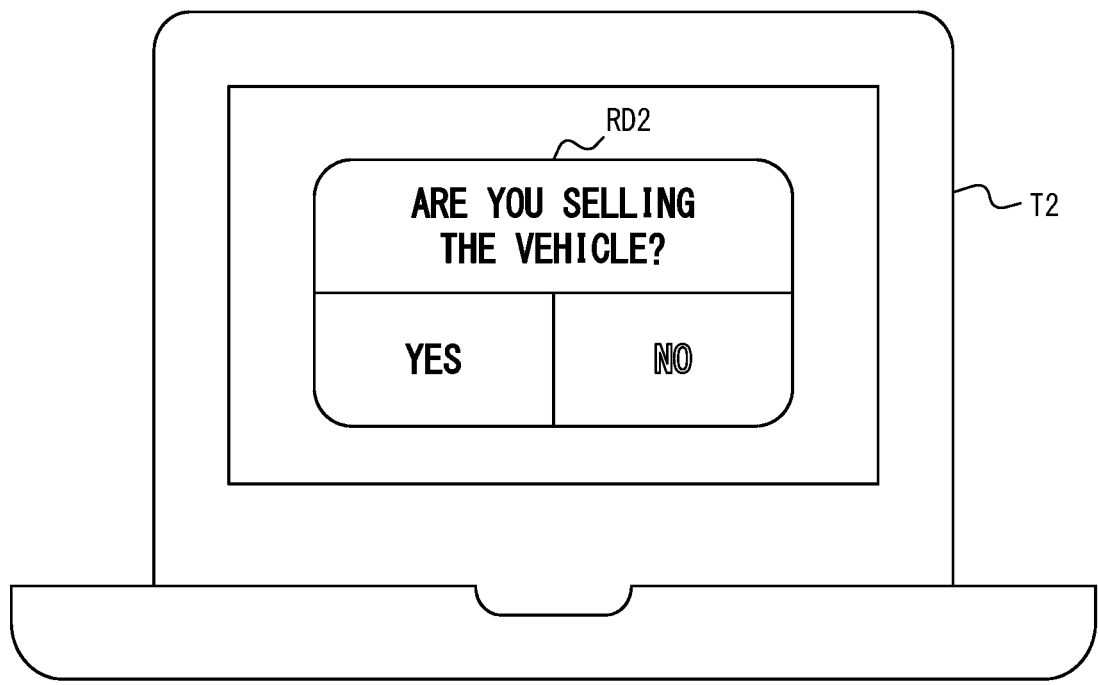
FIG. 6 is a schematic diagram illustrating an example screen on a second terminal apparatus according to an embodiment of the present disclosure.

In the present embodiment, a message "ARE YOU SELLING THE VEHICLE?" is transmitted as the second information RD2 in the form of an inquiry. In the example of FIG. 6, the controller 31 of the second terminal apparatus T2 receives the message from the control apparatus 20 via the communication interface 33 and controls the output interface 35, which is a display or the like, to output the received message. In the present embodiment, the controller 31 of the second terminal apparatus T2 controls a display corresponding to the output interface 35 to display the content of the second information RD2, but the controller 31 may also control a speaker corresponding to the output interface 35 to output the content of the second information RD2 as audio. The reason for transmitting, as the second information RD2, a message "ARE YOU SELLING THE VEHICLE?" in a case in which the first vehicle data VD1 is viewed on the second terminal apparatus T2 is as follows. In a case in which viewing is detected from the vehicle dealer that is regularly visited by the owner P of the vehicle V, it can be considered that the first vehicle data VD1 is being viewed by the owner P who, for example, wishes to obtain evaluation information such as the sale price of the vehicle V. Therefore, it can be considered that the owner P is likely to dispose of the vehicle V.

In step S7, in a case in which the user U has performed an operation to input a response to the inquiry, the controller 31 of the second terminal apparatus T2 controls the input interface 34 to accept the operation. In the example of FIG. 6, the user U performs an operation of touching "YES" or "NO", displayed on the touch screen serving as the input interface 34 of the second terminal apparatus T2. The controller 31 of the second terminal apparatus T2 accepts the operation of touching "YES" as an operation by which the user U provides input, in response to the inquiry, indicating that the owner of the vehicle V is to change. Instead of touching the touch screen, the user U may provide audio input through a microphone serving as the input interface 34 of the second terminal apparatus T2. The controller 31 of the second terminal apparatus T2 generates answer data AD2 that indicates that the owner of the vehicle V is to change. The controller 31 of the second terminal apparatus T2 transmits the generated answer data AD2 to the control apparatus 20 via the communication interface 33. Then, the process of step S8 is performed. On the other hand, the controller 31 of the second terminal apparatus T2 accepts the operation of touching "NO" as an operation by which the user U provides input, in response to the inquiry, indicating that the owner of the vehicle V is not to change. In this case, the flow of FIG. 4 ends.

In step S8, the controller 21 of the control apparatus 20 notifies the administrator of the system 10 of information that indicates that the owner of the vehicle V is to change. Specifically, the controller 21 of the control apparatus 20 receives, via the communication interface 23, the answer data AD2 transmitted from the second terminal apparatus T2 in step S7. The controller 21 transmits the received answer data AD2 to a server or other management device installed at the facility of the administrator of the system 10. This is to give the administrator of the system 10 an opportunity to collect information on whether the vehicle is to be sold, i.e., whether the owner is to change. Further, the controller 13 may transmit a message to the second terminal apparatus T2 to confirm the new owner of the vehicle V.

According to the present embodiment, a change in vehicle ownership is detected from the viewing history of the vehicle data VD. Therefore, even in a case in which a vehicle is sold without going through an authorized dealer of the vehicle manufacturer, who is the administrator of the system 10, the vehicle manufacturer can more easily detect a change in ownership resulting from the sale of the vehicle. Accordingly, this makes it easier to obtain consent from the new owner for the disclosure of the vehicle data VD, which further facilitates effective use of the vehicle data VD.

As described above, the controller 21 of the control apparatus 20 detects that the first vehicle data VD1, which is obtained by monitoring a state of the vehicle and disclosed with consent of the owner P of the vehicle V, has been viewed by a user U. The controller 21 notifies the user U of either the first information RD1 prompting for consent to disclose the second vehicle data VD2, obtained by monitoring a state of the vehicle V after a point in time at which the first vehicle data VD1 was viewed, or the second information RD2 inquiring whether the owner of the vehicle V is to change.

According to the present embodiment, an inquiry is transmitted to the user U when the first vehicle data VD1 is viewed by the user U. Therefore, even in a case in which the owner of the vehicle V has changed due to reasons such as the sale of the vehicle, consent can be sought from the new owner. Accordingly, a situation is likely to be avoided in which the second vehicle data VD2 cannot be disclosed to a third party due to the lack of consent from the new owner.

According to the present embodiment, the effective use of the vehicle data VD may be facilitated.

As a variation of the present embodiment, the controller 21 of the control apparatus 20 may acquire purpose information that indicates the purpose for which the user U views the first vehicle data VD1 and determine whether to notify the user U of the first information RD1 or the second information RD2 according to the purpose indicated by the acquired purpose information. Specifically, in step S2, instead of determining the location from which the first vehicle data VD1 was viewed, the controller 21 may determine the purpose for which the user U views the first vehicle data VD1. In the present variation, the controller 21 determines whether the purpose for which the user U views the first vehicle data VD1 is to purchase or to sell the vehicle V.

Figure 7:
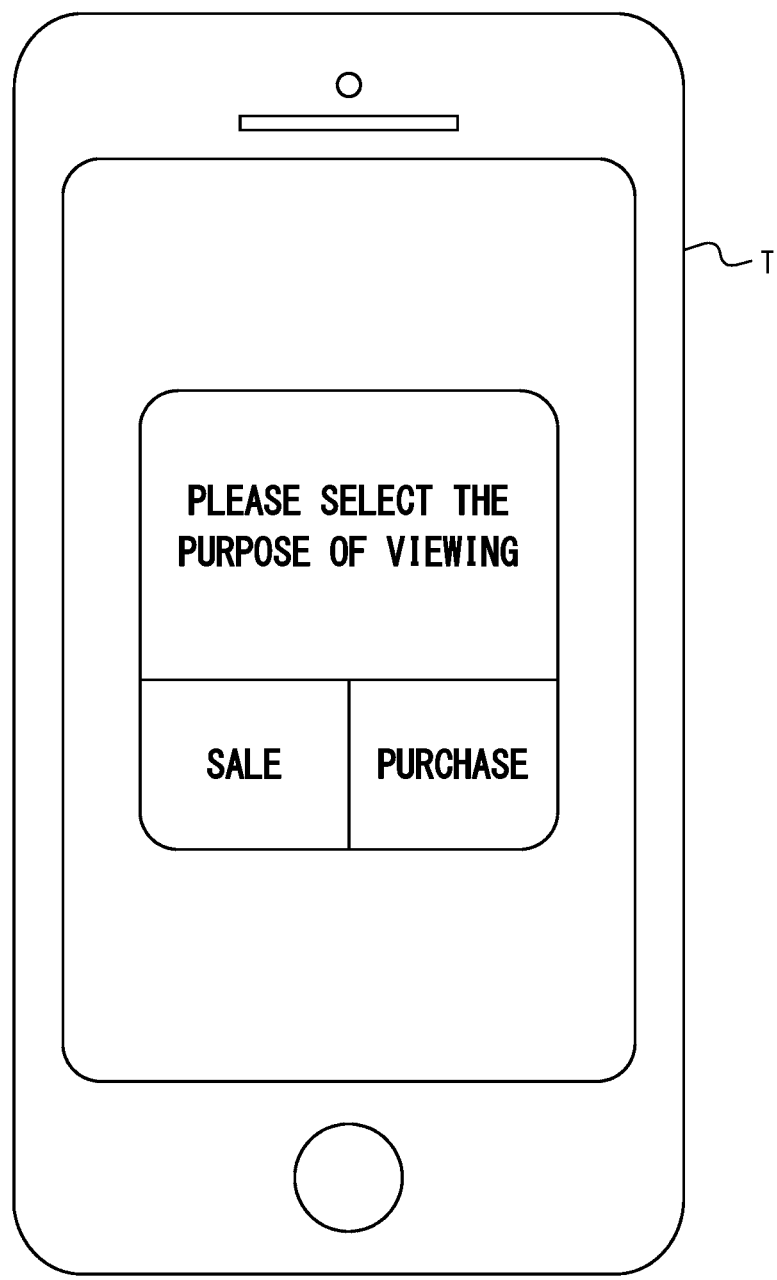
FIG. 7 is a schematic diagram illustrating an example screen on a terminal apparatus according to a variation of an embodiment of the present disclosure.

The purpose may be determined by any appropriate method, but in the present variation, the following method is used. The controller 21 of the control apparatus 20 detects, in step S1, that the first vehicle data VD1 has been viewed by a user U. The controller 21 transmits a message to the terminal apparatus T that transmitted the viewing information, in order to inquire about the purpose of viewing. In the example of FIG. 7, a message "PLEASE SELECT THE PURPOSE OF VIEWING" is transmitted to inquire about the purpose of viewing. The controller 31 of the terminal apparatus T receives the message from the control apparatus 20 via the communication interface 33 and controls the output interface 35, which is a display or the like, to output the received message. In the present variation, the controller 31 of the terminal apparatus T controls a display corresponding to the output interface 35 to display the message, but the controller 31 may also control a speaker corresponding to the output interface 35 to output the message as audio.

In a case in which the user U has performed an operation to input a response to the message, the controller 31 of the terminal apparatus T controls the input interface 34 to accept the operation. In the example of FIG. 7, the user U performs an operation of touching "SALE" or "PURCHASE", displayed on the touch screen serving as the input interface 34 of the second terminal apparatus T2. The controller 31 of the terminal apparatus accepts this operation as an operation in which the user U inputs the purpose for viewing the first vehicle data VD1. Instead of touching the touch screen, the user U may provide audio input through a microphone serving as the input interface 34 of the terminal apparatus T. The controller 31 of the terminal apparatus generates purpose information that indicates the purpose, inputted by the user U, for viewing the first vehicle data VD1. The controller 31 of the terminal apparatus T transmits the generated purpose information to the control apparatus 20 via the communication interface 33.

The controller 21 of the control apparatus 20 receives, via the communication interface 23, the purpose information transmitted from the terminal apparatus T. In a case in which the purpose indicated by the received purpose information is to purchase the vehicle V, the process of step S3 is performed. Specifically, the controller 21 notifies the user U of the first information RD1 in a case in which the purpose indicated by the purpose information is determined to be "PURCHASE". On the other hand, in a case in which the purpose indicated by the received purpose information is to sell the vehicle V, the process of step S7 is performed. Specifically, the controller 21 notifies the user U of the second information RD2 in a case in which the purpose indicated by the purpose information is determined to be "SALE". In the present variation, processing other than step S2 is similar to the processing in the embodiment described above, and hence an explanation is omitted.

According to the present variation, the purpose of viewing the first vehicle data VD1 is determined. Therefore, a change in ownership of the vehicle V is detected even in a case in which the first vehicle data VD1 is viewed via a terminal apparatus in the possession of the user U, for example, rather than via a terminal apparatus installed at a vehicle dealer. Further, the present variation enables to change the content of the inquiry to the user U according to the purpose of viewing, and thus consent to disclose the vehicle data can be more easily obtained from a new owner.

According to the present variation, the effective use of the vehicle data VD may be further facilitated.

As a variation of the present embodiment, the controller 21 of the control apparatus 20 may determine whether to notify the user U of the first information RD1 or the second information RD2 according to whether the user U is the owner P of the vehicle V. Specifically, in step S2, instead of determining the location from which the first vehicle data VD1 was viewed, the controller 21 of the control apparatus 20 may determine whether the user U who viewed the first vehicle data VD1 is the owner P of the vehicle V.

Any appropriate method may be used to determine the determination of whether the user U is the owner P of the vehicle V, but in the present variation, the following method is used. In step S1, the first vehicle data VD1 is viewed by the user U via the terminal apparatus T. The controller 31 of the terminal apparatus T generates viewing information that indicates that the first vehicle data VD1 has been viewed. In this case, the controller 31 of the terminal apparatus T includes, in the viewing information, the identification information of the user U who viewed the first vehicle data VD1 instead of the identification information of the terminal apparatus T. The identification information of the user U is, for example, a user ID. The user ID is, for example, inputted when the user U logs into the terminal apparatus T to view the first vehicle data VD1. The controller 31 transmits, via the communication interface 33, the generated viewing information to the control apparatus 20.

In step S2, the controller 21 of the control apparatus 20 makes the determination based on the user ID included in the viewing information received in step S1. In the memory 22 of the control apparatus 20, for example, a database DB2 is constructed in which information on pairs of a vehicle and the owner recorded for the vehicle is registered in advance. In other words, the database DB2 contains records that include a vehicle in association with the owner ID assigned to the owner of the vehicle. The controller 21 refers to the database DB2 to identify the owner ID assigned to the owner P of the vehicle V. The controller 21 determines that the user U is the owner P in a case in which the identified owner ID matches the user ID included in the received viewing information. In a case in which the user U is determined to be the owner P, the process of step S3 is performed. On the other hand, the controller 21 determines that the user U is not the owner P in a case in which the identified owner ID differs from the user ID included in the received viewing information. In a case in which the user U is determined not to be the owner P, the process of step S6 is performed. In this way, the controller 21 of the control apparatus 20 determines whether the user U is the owner P. The controller 21 determines whether to transmit the first information RD1 or the second information RD2 according to the determination result. In the present variation, the processing from step S3 to step S8 is similar to the processing in the embodiment described above, and hence an explanation is omitted.

According to the present variation, it is determined whether the user U is the owner P of the vehicle V based on the user ID. Even in a case in which a user who is not the owner P of the vehicle V views the first vehicle data VD1 on a terminal apparatus of the vehicle dealer associated with the owner P, the change in ownership of the vehicle V is thus detected. The present variation thus enables to obtain consent more easily from a new owner to disclose the vehicle data VD.

According to the present variation, the effective use of the vehicle data VD may be further facilitated.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

For example, as a variation of the present embodiment, instead of determining whether the first vehicle data VD1 was viewed via the first terminal apparatus T1 or the second terminal apparatus T2, the controller 21 of the control apparatus 20 may determine whether the first vehicle data VD1 was viewed through a used car dealer or auction site that is not among the plurality of vehicle dealers S. Collection of information about whether the vehicle V is sold, i.e., whether ownership changes, by the controller 21 may be triggered by the determination that the first vehicle data VD1 was viewed via a used car dealer or auction site. Specifically, in step S2, the controller 21 determines whether the first vehicle data VD1 was viewed via a used car dealer or auction site. This determination may be made by any procedure, such as the following procedure. The terminal ID of the terminal apparatus T installed in each of the plurality of vehicle dealers S is stored in advance in the memory 22 of the control apparatus 20. The controller 21 compares the terminal ID included in the viewing information received in step S1 with the terminal ID stored in the memory 22. In a case in which there is no terminal ID, among the terminal IDs stored in the memory 22, that matches the received terminal ID, the controller 21 determines that the vehicle data VD1 was viewed via a used car dealer or auction site. Upon determining that the vehicle data VD1 was viewed via a used car dealer or auction site, the controller 21 transmits a message, via the communication interface 23, inquiring who the owner of the vehicle V is, instead of transmitting the first information RD1 or the second information RD2. This is to enable the administrator of the system 10 to acquire information about the new owner of the vehicle V more reliably. In a case in which the first vehicle data VD1 was viewed via a used car dealer or auction site rather than from a vehicle dealer S, it is assumed that the transaction for the vehicle V is being conducted without going through the plurality of vehicle dealers S. Generally, when a transaction for a vehicle V is conducted through a used car dealer or an auction site, information about the new owner, i.e., the buyer of the vehicle V, is often not notified to the system 10 administrator, unlike when the transaction is conducted through a vehicle dealer S. In this example, in a case in which the first vehicle data VD1 is viewed via a used car dealer or auction site that is not among the plurality of vehicle dealers S, the system 10 administrator is given the opportunity to collect information about the owner of the vehicle V. Accordingly, the system 10 administrator can seek consent from the new owner even in a case in which the vehicle V is traded without going through any of the plurality of vehicle dealers S.

According to the present variation, the effective use of the vehicle data VD may be further facilitated.

The invention claimed is:

1. A control apparatus comprising a controller configured to:
  receive viewing information indicating that first vehicle data obtained by monitoring a state of a vehicle and disclosed with consent of an owner of the vehicle has been viewed by a user, the viewing information including a viewing terminal identifier of a terminal apparatus via which the first vehicle data has been viewed by the user;
  compare the viewing terminal identifier included in the received viewing information with a registered terminal identifier of a terminal apparatus installed in each of a plurality of vehicle dealers or in at least one of the plurality of vehicle dealers with which the owner of the vehicle is associated, the registered terminal identifier being stored in advance in a memory;
  notify, when there is no registered terminal identifier stored in the memory that matches the viewing terminal identifier included in the received viewing information, the user, as a possible new owner of the vehicle, of first information prompting for consent to disclose second vehicle data obtained by monitoring a state of the vehicle after a point in time at which the first vehicle data was viewed; and
  notify, when there is a registered terminal identifier stored in the memory that matches the viewing terminal identifier included in the received viewing information, the user, as the owner of the vehicle, of second information inquiring whether the owner of the vehicle is to change.

2. A system comprising:
  the control apparatus according to claim 1; and
  a terminal apparatus configured to transmit the viewing information to the control apparatus when the first vehicle data is viewed via the terminal apparatus by the user.

3. A control apparatus comprising a controller configured to:
  receive viewing information indicating that first vehicle data obtained by monitoring a state of a vehicle and disclosed with consent of an owner of the vehicle has been viewed by a user, the viewing information including a viewing user identifier of the user;
  compare the viewing user identifier included in the received viewing information with a registered user identifier of the owner of the vehicle, the registered user identifier being stored in advance in a memory;
  notify, when there is no registered user identifier stored in the memory that matches the viewing user identifier included in the received viewing information, the user, as a possible new owner of the vehicle, of first information prompting for consent to disclose second vehicle data obtained by monitoring a state of the vehicle after a point in time at which the first vehicle data was viewed; and
  notify, when there is a registered terminal identifier stored in the memory that matches the viewing user identifier included in the received viewing information, the user, as the owner of the vehicle, of second information inquiring whether the owner of the vehicle is to change.

4. A system comprising:
  the control apparatus according to claim 3; and
  a terminal apparatus configured to transmit the viewing information to the control apparatus when the first vehicle data is viewed via the terminal apparatus by the user.

5. A control method comprising:
  receiving viewing information indicating that first vehicle data obtained by monitoring a state of a vehicle and disclosed with consent of an owner of the vehicle has been viewed by a user, the viewing information including a viewing identifier of the user or a terminal apparatus via which the first vehicle data has been viewed by the user;
  comparing the viewing identifier included in the received viewing information with a registered identifier of the owner of the vehicle or a terminal apparatus installed in each of a plurality of vehicle dealers or in at least one of the plurality of vehicle dealers with which the owner of the vehicle is associated, the registered identifier being stored in advance in a memory;

notifying, when there is no registered identifier stored in the memory that matches the viewing identifier included in the received viewing information, the user, as a possible new owner of the vehicle, of first information prompting for consent to disclose second vehicle data obtained by monitoring a state of the vehicle after a point in time at which the first vehicle data was viewed; and notify, when there is a registered identifier stored in the memory that matches the viewing identifier included in the received viewing information, the user, as the owner of the vehicle, of second information inquiring whether the owner of the vehicle is to change.

\* \* \* \* \*